US010630142B2

(12) United States Patent
Kanaya et al.

(10) Patent No.: US 10,630,142 B2
(45) Date of Patent: Apr. 21, 2020

(54) ELECTROMAGNETIC ACTUATOR, ACTIVE VIBRATION DAMPER USING THE SAME, AND METHOD OF MANUFACTURING ELECTROMAGNETIC ACTUATOR

(71) Applicant: SUMITOMO RIKO COMPANY LIMITED, Komaki-shi, Aichi (JP)

(72) Inventors: Tomohiro Kanaya, Komaki (JP); Akira Ohji, Komaki (JP)

(73) Assignee: SUMITOMO RIKO COMPANY LIMITED, Komaki-shi (JP)

(*) Notice: Subject to any disclaimer, the term of this patent is extended or adjusted under 35 U.S.C. 154(b) by 275 days.

(21) Appl. No.: 15/591,515

(22) Filed: May 10, 2017

(65) Prior Publication Data

US 2017/0346363 A1 Nov. 30, 2017

(30) Foreign Application Priority Data

May 27, 2016 (JP) .................................. 2016-106774

(51) Int. Cl.
*H02K 7/14* (2006.01)
*H02K 33/16* (2006.01)
(Continued)

(52) U.S. Cl.
CPC .............. *H02K 7/14* (2013.01); *H02K 15/02* (2013.01); *H02K 33/02* (2013.01); *H02K 33/16* (2013.01)

(58) Field of Classification Search
CPC .......... H02K 7/14; H02K 15/02; H02K 33/02; H02K 33/16
See application file for complete search history.

(56) References Cited

U.S. PATENT DOCUMENTS

2009/0102105 A1* 4/2009 Hasegawa ............. F16F 13/262
267/122
2011/0101582 A1* 5/2011 Kanaya ................... F16F 13/18
267/140.14
(Continued)

FOREIGN PATENT DOCUMENTS

| CN | 107023608 A | 8/2017 |
| JP | S53-123101 U | 10/1978 |
| JP | 2012-042017 A | 3/2012 |

OTHER PUBLICATIONS

Nov. 28, 2018 Office Action issued in Chinese Patent Application No. 201710344914.3.
(Continued)

*Primary Examiner* — Naishadh N Desai
(74) *Attorney, Agent, or Firm* — Oliff PLC

(57) ABSTRACT

An electromagnetic actuator including: a stator and a mover configured to have an oscillation force exerted between them, the stator and the mover being arranged in a direction orthogonal to a direction of oscillation with a space in between; and at least one plate spring connecting the stator and the mover to each other, the plate spring permitting relative displacement of the stator and the mover in the direction of oscillation while positioning the stator and the mover with respect to each other in the direction orthogonal to the direction of oscillation, wherein at least one through hole piercing the plate spring in a thickness direction is formed in a portion of the plate spring that corresponds to the space between the stator and the mover.

6 Claims, 6 Drawing Sheets

(51) Int. Cl.
*H02K 15/02* (2006.01)
*H02K 33/02* (2006.01)

(56) References Cited

U.S. PATENT DOCUMENTS

| 2015/0198215 | A1* | 7/2015 | Koyama | H02K 41/035 |
|---|---|---|---|---|
| | | | | 267/140.14 |
| 2015/0198216 | A1* | 7/2015 | Koyama | H02K 41/035 |
| | | | | 267/140.14 |
| 2017/0219039 | A1* | 8/2017 | Inoue | F16F 7/1011 |

OTHER PUBLICATIONS

Oct. 10, 2019 Office Action issued in Japanese Patent Application No. 2016-106774.

* cited by examiner

ELECTROMAGNETIC ACTUATOR, ACTIVE VIBRATION DAMPER USING THE SAME, AND METHOD OF MANUFACTURING ELECTROMAGNETIC ACTUATOR

INCORPORATED BY REFERENCE

The disclosure of Japanese Patent Application No. 2016-106774 filed on May 27, 2016 including the specification, drawings and abstract is incorporated herein by reference in its entirety.

BACKGROUND OF THE INVENTION

1. Field of the Invention

The present invention relates to an electromagnetic actuator including a stator and a mover configured to be oscillated relative to each other that has a structure wherein the stator and the mover are elastically connected to each other by a plate spring, an active vibration damper using the same, and a method of manufacturing the electromagnetic actuator.

2. Description of the Related Art

An electromagnetic actuator including a stator and a mover configured to be oscillated relative to each other has been known from the past. For the electromagnetic actuator, as Japanese Unexamined Patent Publication No. JP-A-2012-042017 discloses for example, a magnetic field is caused through energization to coils provided at either of the stator or the mover, and the effect of the magnetic field is used to oscillate the stator and the mover relative to each other.

As JP-A-2012-042017 discloses, the stator and the mover may be elastically connected to each other by plate springs. This keeps the stator and the mover at appropriate initial positions relative to each other when the energization to the coil is stopped. This also permits relative displacement of the stator and the mover owing to elastic deformation of the plate springs during the energization to the coils. Additionally, the stator and the mover are relatively positioned in the axis-perpendicular direction by the plate springs so as to maintain the space between the stator and the mover. Consequently, it is possible to make magnetic attractive and repulsive forces act properly along the entire circumference between these stator and mover.

However, if the plate springs expanding as orthogonal to the direction of oscillation within a housing of the electromagnetic actuator are provided as JP-A-2012-042017, the plate springs partition the space inside the housing. Hence, it is difficult to keep the stator and the mover at appropriate positions precisely during manufacture of the electromagnetic actuator. Therefore, high dimension accuracy is required for components that relates to relative positions of the stator and the mover. Moreover, since the plate springs cover the stator and the mover, it is also difficult to perform the check work of the inside, such as checking of the space between the stator and the mover, visually or using a measurement razor, an endoscope, or the like.

SUMMARY OF THE INVENTION

It is therefore one object of the present invention to provide an electromagnetic actuator of novel structure which is able to allow check of the position and the surface state of the stator and the mover after they are elastically connected by the plate spring, visually or by an inserted instrument, and to elastically connect the stator and the mover by the plate spring while positioning the stator and the mover precisely during the manufacture.

Moreover, it is another object of the present invention to provide an active vibration damper of novel structure using the above-described electromagnetic actuator. Furthermore, it is yet another object of this invention to provide a novel method of manufacturing the electromagnetic actuator which is able to connect the stator and the mover using the plate spring while setting the space between the stator and the mover with easiness and high accuracy during the manufacture of the aforesaid electromagnetic actuator.

The above and/or optional objects of this invention may be attained according to at least one of the following modes of the invention. The following modes and/or elements employed in each mode of the invention may be adopted at any possible optional combinations.

Specifically, a first mode of the present invention provides an electromagnetic actuator comprising: a stator and a mover configured to have an oscillation force exerted between them, the stator and the mover being arranged in a direction orthogonal to a direction of oscillation with a space in between; and at least one plate spring connecting the stator and the mover to each other, the plate spring permitting relative displacement of the stator and the mover in the direction of oscillation while positioning the stator and the mover with respect to each other in the direction orthogonal to the direction of oscillation, wherein at least one through hole piercing the plate spring in a thickness direction is formed in a portion of the plate spring that corresponds to the space between the stator and the mover.

According to the electromagnetic actuator having this structure of the first mode, when the stator and the mover are connected to each other by the plate spring, it is possible to check the stator and the mover through the through hole of the plate spring. Then, it is also possible to perform such operation as position adjustment of the stator and the mover using an instrument, through insertion of the instrument via the through hole in the plate spring.

Especially, since the through hole of the plate spring is formed at a position corresponding to the space between the stator and the mover, it is possible as well to check the space between the stator and the mover, visually or using a measurement instrument. It is also possible to easily set relative positions of the stator and the mover by inserting a jig into the space in between.

A second mode of the present invention provides the electromagnetic actuator according to the first mode, wherein the at least one plate spring comprises a plurality of plate springs that are remote from each other in the direction of oscillation, and the through hole of each plate spring is formed in a position corresponding to each other in the direction of oscillation.

According to the second mode, the stator and the mover are connected to each other by the plurality of plate springs, which are mutually remote in the direction of oscillation, so that the stator and the mover are stably positioned and kept relative to each other. In each of the plurality of plate springs, the through hole is formed. The through holes of the plate springs are formed to correspond to each other in position in the direction of oscillation. Consequently, for example, visual check of the space between the stator and the mover becomes easier, and so does insertion of an instrument, a jig, or the like in the space between the stator and the mover or the like via the through holes of the plurality of plate springs.

A third mode of the present invention provides the electromagnetic actuator according to the second mode, wherein the plate springs are disposed on both outer sides of the stator and the mover in the direction of oscillation.

According to the third mode, the stator and the mover can be positioned and kept by the plurality of plate springs more stably. Moreover, since the through holes formed in the plate springs are disposed to correspond to each other in position in the direction of oscillation, check of relative positions of the stator and the mover by visual check through the through holes or the like is easy.

A fourth mode of the present invention provides the electromagnetic actuator according to any one of the first to third modes, wherein the at least one through hole of the plate spring comprises a plurality of through holes, and the through holes are arranged in sequence in a circumferential direction that corresponds to the space between the stator and the mover.

According to the fourth mode, each of the plurality of through holes is formed in a position corresponding to the space between the stator and the mover, whereby it is possible to check the space between the stator and the mover through the through holes at a plurality of locations in the circumferential direction, or the like.

A fifth mode of the present invention provides the electromagnetic actuator according to any one of the first to fourth modes, wherein the through hole has a hole cross-sectional shape extending in a circumferential direction that corresponds to the space between the stator and the mover.

According to the fifth mode, the through hole has a hole cross-sectional shape that is long in the circumferential direction, it is possible to suppress an effect on the spring characteristics of the plate spring, which may be caused by formation of the through holes and the like. In addition to that, it becomes possible to check the space between the stator and the mover with respect to a wide range thereof, and to operate or retain the stator and the mover with respect to a wide range thereof using an instrument or a jig.

A sixth mode of the present invention provides an active vibration damper comprising the electromagnetic actuator according to any one of the first to fifth modes, wherein the stator is configured to be attached to a member subject to vibration damping so that the mover is elastically supported on the member subject to vibration damping via an elastic connecting rubber.

According to this active vibration damper constructed following the sixth mode, the electromagnetic actuator that allows the check of the space between the stator and the mover and relative position setting of the stator and the mover with high accuracy is used, thereby making it possible to stably obtain the target vibration damping performance, for example.

A seventh mode of the present invention provides a method of manufacturing an electromagnetic actuator that includes: a stator and a mover configured to have an oscillation force exerted between them, the stator and the mover being arranged in a direction orthogonal to a direction of oscillation with a space in between; and a plate spring connecting the stator and the mover to each other, the plate spring permitting relative displacement of the stator and the mover in the direction of oscillation while positioning the stator and the mover with respect to each other in the direction orthogonal to the direction of oscillation, the method comprising a space setting step in which a spacer jig is inserted between the stator and the mover through at least one through hole formed in the plate spring, and the space between the stator and the mover is set by the spacer jig.

According to the method of manufacturing the electromagnetic actuator of this structure following the seventh mode, by inserting the spacer jig in the space between the stator and the mover via the through hole of the plate spring, the space between the stator and the mover can be set by the spacer jig with easiness and high precision.

An eighth mode of the present invention provides the method of manufacturing the electromagnetic actuator according to the seventh mode, wherein the spacer jig includes: at least one spacer part configured to be inserted between the stator and the mover through the through hole; and an insertion regulator part that supports an end of the spacer part.

According to the eighth mode, when the spacer part is inserted in the space between the stator and the mover via the through hole, the insertion is made until the insertion regulator part is abutted against the plate spring or the like. Thus, it is possible to readily insert the spacer part in relation to the space between the stator and the mover up to an appropriate position. Also, a manufacturing worker can hold the insertion regulator part, so that handling of the spacer jig can be facilitated.

A ninth mode of the present invention provides the method of manufacturing the electromagnetic actuator according to the eighth mode, wherein the at least one through hole of the plate spring comprises a plurality of through holes, and the through holes are arranged in sequence in a circumferential direction that corresponds to the space between the stator and the mover, and the at least one spacer part of the spacer jig comprises a plurality of spacer parts, and the spacer parts are integrally connected by the insertion regulator part while being arranged in sequence in the circumferential direction so as to correspond to the respective through holes.

According to the ninth mode, the plurality of spacer parts can be inserted in the space between the stator and the mover through the plurality of through holes at the plurality of locations in the circumferential direction. This makes it possible to more precisely set the space between the stator and the mover.

A tenth mode of the present invention provides the method of manufacturing the electromagnetic actuator according to the eighth or ninth mode, wherein the through hole has a hole cross-sectional shape extending in a circumferential direction that corresponds to the space between the stator and the mover, and the spacer part has a plate shape extending in the circumferential direction that corresponds to the space between the stator and the mover.

According to the tenth mode, since the spacer part with a sufficient circumferential length is inserted in the space between the stator and the mover, the stator and the mover are stably positioned by the spacer part, and the space between the stator and the mover is set with high accuracy.

According to the present invention, the through hole is formed in the plate spring which connects the stator and the mover relative to each other. Thus, when the stator and the mover are connected to each other by the plate spring, it is possible to check the stator and the mover via the through hole formed in the plate spring. Then, additionally, it is possible to perform an operation such as adjustment of the positions of the stator and the mover using an instrument, by inserting the instrument via the through hole of the plate spring. Moreover, the through hole of the plate spring is formed in a position corresponding to the space between the stator and the mover. This can make it easy to check the space between the stator and the mover, visually or using an instrument, and to insert a jig in the space between the stator and the mover.

BRIEF DESCRIPTION OF THE DRAWINGS

The foregoing and/or other objects, features and advantages of the invention will become more apparent from the following description of a preferred embodiment with reference to the accompanying drawing in which like reference numerals designate like elements and wherein.

DETAILED DESCRIPTION OF PREFERRED EMBODIMENTS

Figure 1:
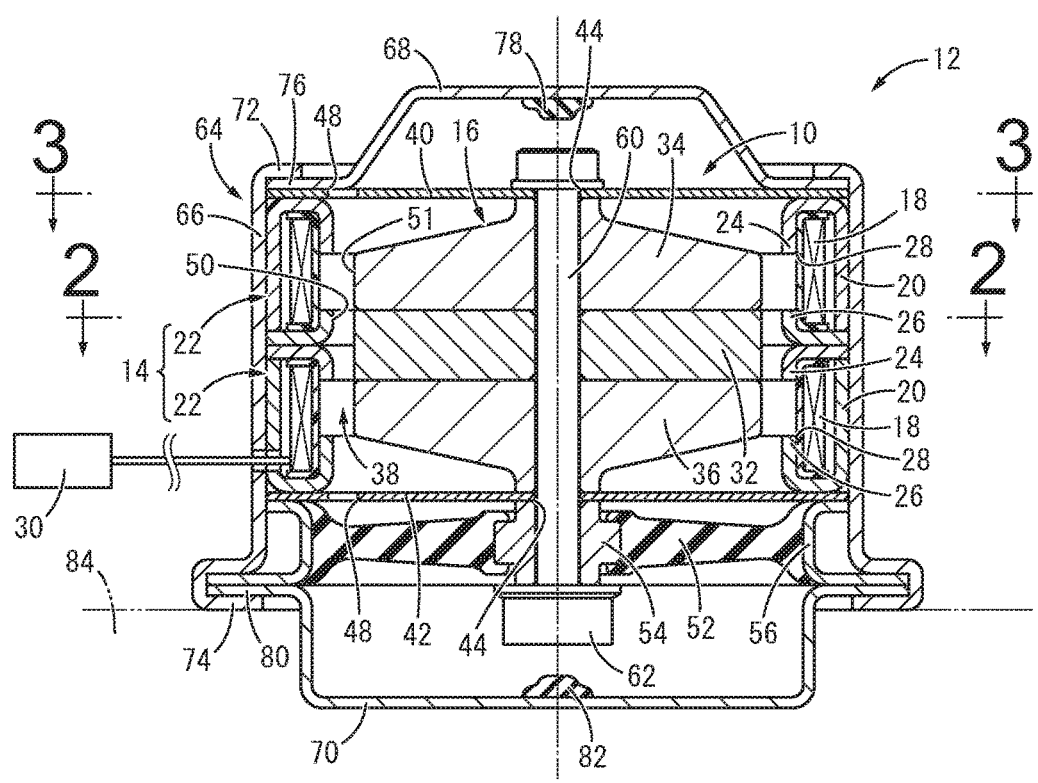
FIG. 1 is a longitudinal cross-sectional view showing an active vibration damper as a first embodiment of the present invention, taken along line 1-1 of FIG. 2.

There will be described the embodiments of the present invention referring to the drawings.

Figure 2:
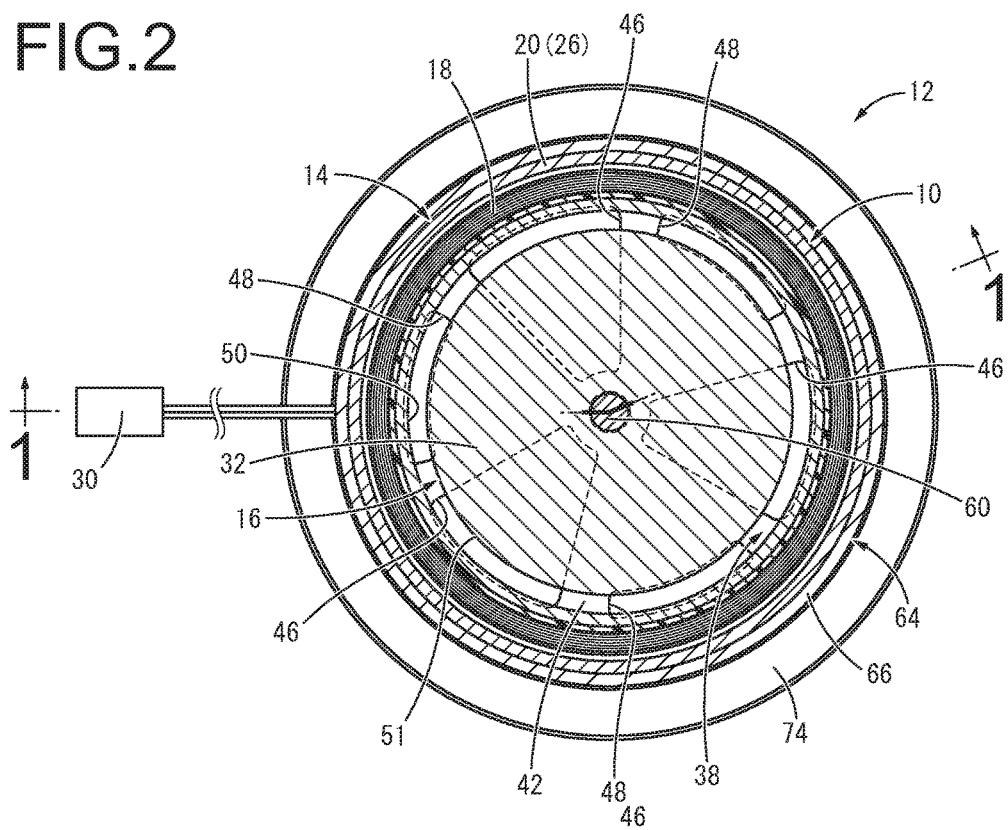
FIG. 2 is a cross-sectional view taken along line 2-2 of FIG. 1.

FIGS. 1 and 2 show an active vibration damper 12 including an electromagnetic actuator 10 as a first embodiment of the present invention. The electromagnetic actuator 10 constituting the active vibration damper 12 has a stator 14 and a mover 16 configured to have an oscillation force exerted between them. In the explanation hereinafter, as a general rule, the up-down direction means the up-down direction in FIG. 1, which is the direction of oscillation of the electromagnetic actuator 10, and the axial direction of the active vibration damper 12.

More specifically, the stator 14 includes a coil member 22 wherein an outer yoke 20 is assembled to a coil 18. The outer yoke 20 is formed of a ferromagnetic material such as iron or the like, and is provided to cover the upper and lower faces and the outer peripheral face of the coil 18. In this embodiment, the outer yoke 20 is constituted by a member covering the upper face and the upper portion of the inner peripheral face of the coil 18, and a member covering the lower face, the outer peripheral face, and the lower portion of the inner peripheral face of the coil 18. The outer yoke 20 includes an upper magnetic pole forming part 24, which covers the upper portion of the inner peripheral face, and a lower magnetic pole forming part 26, which covers the lower portion of the inner peripheral face. A magnetic gap 28 is formed between these upper magnetic pole forming part 24 and lower magnetic pole forming part 26 in the up-down direction, i.e., the upper magnetic pole forming part 24 and the lower magnetic pole forming part 26 are spaced from each other in the up-down direction with the magnetic gap 28. In this embodiment, two coil members 22, 22 whose structures are mutually symmetrical with respect to an axis-perpendicular plane are disposed to be superposed to each other in the up-down direction.

An end of the coil 18 is brought out of a housing 64 described later and connected to a power supply unit 30. Through energization to the coil 18, a magnetic field is formed around the coil 18, while magnetic flux is guided by a magnetic path constituted by the outer yoke 20, thereby forming respective magnetic poles in the upper and lower magnetic pole forming parts 24, 26. In the present embodiment, the upper and lower coils 18, 18 are wound in the adverse direction relative to each other. Consequently, through the energization to the coils 18, 18, mutually different kinds of magnetic poles are formed in the upper magnetic pole forming part 24 of the upper outer yoke 20 and the upper magnetic pole forming part 24 of the lower outer yoke 20.

The mover 16 has a structure wherein an upper inner yoke 34 and a lower inner yoke 36 are superposed on the respective faces of a permanent magnet 32 of about annular plate shape. The permanent magnet 32 is an alnico-based cast magnet, a barium-based ferrite magnet, or the like, and it is magnetized in the up-down direction.

Each of the upper inner yoke 34 and the lower inner yoke 36 is formed of a ferromagnetic material such as iron or the like with a nearly annular plate shape as a whole. The upper face of the upper inner yoke 34 and the lower face of the lower inner yoke 36 are tapered faces, so that both of the upper and lower inner yokes 34, 36 become gradually thinner as they go radially outward. The upper inner yoke 34 is superposed on the upper face of the permanent magnet 32, while the lower inner yoke 36 is superposed on the lower face of the permanent magnet 32. These inner yokes 34, 36 are magnetized, thereby always forming magnetic poles on the radially outer faces of the inner yokes 34, 36.

The mover 16 of this structure is disposed radially inside the stator 14. The stator 14 and the mover 16 are disposed at positions separate from one another with a space 38 in the axis-perpendicular direction. In the present embodiment, when the stator 14 and the mover 16 are disposed at their initial positions such that magnetic attractive forces acting between the outer yokes 20, 20 and the upper and lower inner yokes 34, 36 balance out, the up-down center of the stator 14 is substantially aligned with the up-down center of the mover 16. In the initial positions, the radially outer end of the upper inner yoke 34 is axially positioned to the magnetic gap 28 of the upper outer yoke 20, while the radially outer end of the lower inner yoke 36 is axially positioned to the magnetic gap 28 of the lower outer yoke 20.

The upper parts of the stator 14 and the mover 16 are connected to one another by an upper plate spring 40, while the lower parts of them are connected to one another by a lower plate spring 42. Since the upper and lower plate springs 40, 42 have substantially the same structure in this embodiment, the structure of the upper plate spring 40 will be explained here.

Figure 3:
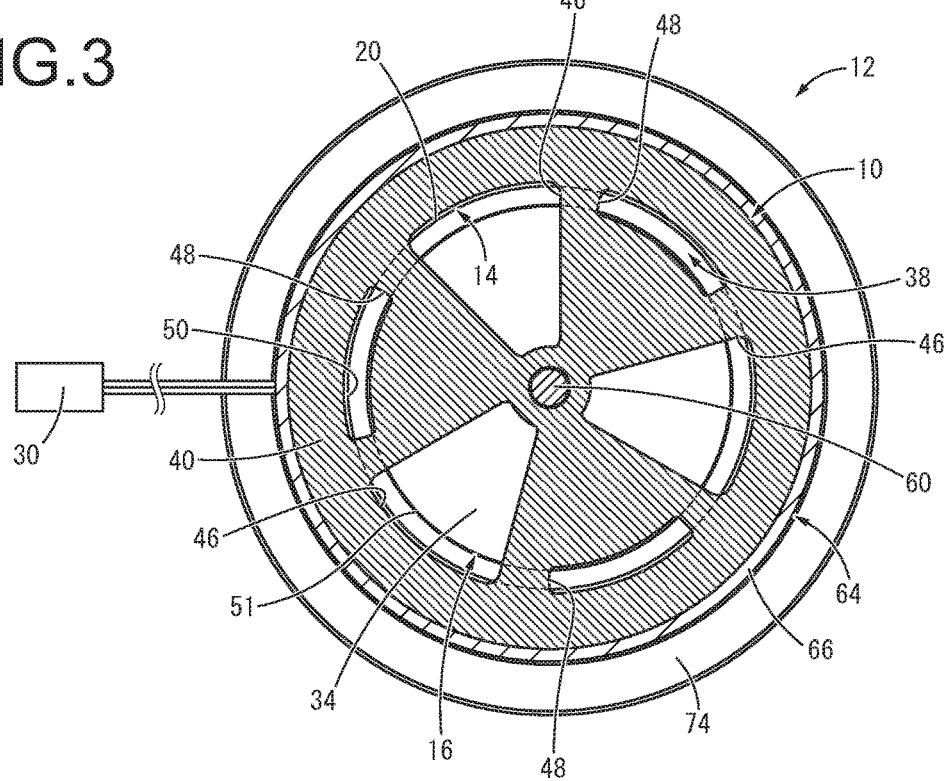
FIG. 3 is a cross-sectional view taken along line 3-3 of FIG. 1.

As FIGS. 1 and 3 show, the upper plate spring 40 has a thin nearly annular plate shape, while having a bolt insertion hole 44 formed to pierce the radially center portion thereof in the thickness direction. Additionally, three first through holes 46 and three second through holes 48 are formed to pierce the upper plate spring 40 in the thickness direction. As FIG. 3 shows, the first through hole 46 has a substantially fan-like hole cross-sectional shape that goes up to the proximity of the center of the upper plate spring 40 and extends in the circumferential direction with a predetermined radial width dimension. The three first through holes 46 are formed as spaced from one another in the circumferential direction. As FIG. 3 shows, the second through hole 48 has a slit form extending in the circumferential direction with a prescribed radial width dimension, and the radially outer end thereof is in roughly the same radial position as that of the radially outer end of the first through hole 46 while the radially inner end thereof is positioned further radially outside than the radially inner end of the first through hole 46. The first through holes 46 and the second through holes 48 are formed alternately in the circumferential direction of the upper plate spring 40. That is, the three first through holes 46, 46, 46 and the three second through holes 48, 48, 48 are arranged in sequence in the circumferential direction and separated from one another in the circumferential direction. In the present embodiment, the three first through holes 46, 46, 46 and the three second through holes 48, 48, 48 are disposed with nearly equal intervals in the circumferential direction of the upper plate spring 40.

For the upper plate spring 40 of this structure, the radially outer end is superposed and fixed on the upper face of the stator 14, while the radially inner end is superposed and fixed on the upper face of the radially inner end of the mover 16. On the other hand, for the lower plate spring 42 having the same structure as that of the upper plate spring 40, the radially outer end is superposed and fixed on the lower face of the stator 14, while the radially inner end is superposed and fixed on the lower face of the radially inner end of the mover 16. Consequently, the upper and lower plate springs 40, 42 are disposed on both axial outer sides of the stator 14 and the mover 16, while being remote from each other. The upper end of the stator 14 and the upper end of the mover 16 are mutually connected by the upper plate spring 40, while the lower end of the stator 14 and the lower end of the mover 16 are mutually connected by the lower plate spring 42. Note that, since the upper and lower plate springs 40, 42 are superposed on the stator 14 and the mover 16 in contact, they are desirably formed of a nonmagnetic material.

In this way, the stator 14 and the mover 16, which are mutually connected by the upper and lower plate springs 40, 42 expanding in the axis-perpendicular direction, are permitted to be relatively displaced in the up-down direction, owing to elastic deformation of the upper and lower plate springs 40, 42 in the thickness direction. Additionally, the stator 14 and the mover 16 are positioned with respect to each other in the axis-perpendicular direction by the upper and lower plate springs 40, 42. Where the energization to the coils 18, 18 is halted, the stator 14 and the mover 16 are elastically retained in the initial positions relative to each other, based on the elasticity of the upper and lower plate springs 40, 42.

The radially outer parts of the first through holes 46 formed at the upper and lower plate springs 40, 42 extend in the circumferential direction, while corresponding to the space 38 between an inner peripheral face 50 of the stator 14 and an outer peripheral face 51 of the mover 16 in the radial direction. Meanwhile, the second through holes 48 formed at the upper and lower plate springs 40, 42 extend in the circumferential direction, while corresponding to the space 38 between the inner peripheral face 50 of the stator 14 and the outer peripheral face 51 of the mover 16 in the radial direction. The first through holes 46 and the second through holes 48 formed at the upper and lower plate springs 40, 42 are disposed in positions that correspond to the space 38 such that the through holes are overlapped with the space 38, which is formed between the inner peripheral face 50 of the stator 14 and the outer peripheral face 51 of the mover 16 in the radial direction, as viewed in the axial direction.

In this embodiment, each of the radially outer parts of the first through holes 46 and the second through holes 48 in the upper and lower plate springs 40, 42, and the space 38 has an arc shape extending on the circumference of a generally concentric circle with the central axis. The radially outer parts of the first through holes 46 and the second through holes 48 in the upper and lower plate springs 40, 42 have roughly the same shape and are provided on the circumference by equal intervals.

The inner peripheral face 50 of the stator 14 and the outer peripheral face 51 of the mover 16 are positioned such that they are, partially in the circumferential direction, overlapped with the first through holes 46 and the second through holes 48 as viewed in the axial direction. On each axial extension of the inner peripheral face 50 of the stator 14 and the outer peripheral face 51 of the mover 16, the first through holes 46 and the second through holes 48 open. That is, the radial distance between the inner peripheral face 50 of the stator 14 and the outer peripheral face 51 of the mover 16 which face each other is smaller than the radial width dimension for the first through hole 46 and the second through hole 48. The inner peripheral face 50 of the stator 14 and the outer peripheral face 51 of the mover 16 are positioned further inside in the width direction than the first through hole 46 and the second through hole 48, when viewed in the axial direction. Each of the inner peripheral face 50 of the stator 14 and the outer peripheral face 51 of the mover 16 is positioned such that it is overlapped with the first through holes 46 and the second through holes 48 when viewed in the axial direction. Also, at least one of the inner peripheral face 50 and the outer peripheral face 51 may be positioned at roughly the same radial position as that of the edge of the second through hole 48 in the width direction so that it is overlapped with the edge of the second through hole 48 in the width direction, when viewed in the axial direction. Besides, it is also possible that both of the inner peripheral face 50 of the stator 14 and the outer peripheral face 51 of the mover 16 are disposed such that they are overlapped with the edge of the second through hole 48 in the width direction, when viewed in the axial direction, while the radial distance between the inner peripheral face 50 and the outer peripheral face 51 that face each other is set to be the same as the radial width dimension of the second through hole 48.

Moreover, in this embodiment, the first through holes 46 of the upper plate spring 40 and the first through holes 46 of the lower plate spring 42 are disposed at nearly the same circumferential position. Additionally, the second through holes 48 of the upper plate spring 40 and the second through holes 48 of the lower plate spring 42 are disposed at nearly the same circumferential position. In short, the orientation in the circumferential direction for the upper plate spring 40 and the lower plate spring 42 of the present embodiment is determined relative to each other such that the circumferential position for the first through holes 46 and the second through holes 48 is mutually the same with respect to the both upper and lower plate springs 40, 42. By so doing, the first through holes 46 of the upper plate spring 40 and the first through holes 46 of the lower plate spring 42 are formed in positions corresponding to each other in the axial direction, while being arranged in series. Meanwhile, the second through holes 48 of the upper plate spring 40 and the second through holes 48 of the lower plate spring 42 are formed in positions corresponding to each other in the axial direction, while being arranged in series.

An elastic connecting rubber 52 is disposed at the lower side of the lower plate spring 42. The elastic connecting rubber 52 is a rubber elastic body of about annular plate shape, wherein an inner connecting member 54 is bonded by vulcanization to the radially inner end, while an outer connecting member 56 is bonded by vulcanization to the radially outer end.

The inner connecting member 54 has a generally cylindrical shape with a small diameter as a whole. To the axially intermediate part of the inner connecting member 54 that protrudes radially outward, the radially inner end of the elastic connecting rubber 52 is bonded by vulcanization, continuously along the entire circumference. The inner connecting member 54 is superposed on the radially inner end of the lower plate spring 42 from below. A connecting bolt 60 is inserted in all the central holes of the mover 16, the upper and lower plate springs 40, 42, and the inner connecting member 54 from above, while a connecting nut 62 is threaded onto the lower end of the connecting bolt 60 where a screw thread is formed. By so doing, the mover 16, the upper and lower plate springs 40, 42, and the inner connecting member 54 are connected integrally with one another in the up-down direction.

Each of all the bolt insertion holes 44 of the upper plate spring 40 and the lower plate spring 42 has a larger diameter than the outer diameter dimension of the shaft of the connecting bolt 60. The central hole of the mover 16 and the central hole of the inner connecting member 54 are formed with generally the same diameter as the outer diameter dimension of the shaft of the connecting bolt 60.

The outer connecting member 56 has a laterally rotated groove shape that opens to the periphery. The groove bottom wall located at the inner peripheral end of the outer connecting member 56 is superposed and fixed on the outer peripheral face of the elastic connecting rubber 52. The lower groove side wall projects more largely to the periphery than the upper groove side wall. The upper groove side wall of the outer connecting member 56 is superposed on the radially outer end of the lower plate spring 42 from below, and fixed to the stator 14 and the radially outer end of the lower plate spring 42 by a housing 64, which will be described later.

The inner connecting member 54 is fixed to the mover 16, while the outer connecting member 56 is fixed to the stator 14. Consequently, the stator 14 and the mover 16 are elastically connected to each other at the lower side than the lower plate spring 42 by the elastic connecting rubber 52, whereby the mover 16 is elastically supported by the stator 14 via the elastic connecting rubber 52.

The stator 14 is fixed to the housing 64. The housing 64 is a member of high rigidity formed of a metal or the like, having a hollow cylindrical shape as a whole. More specifically, the housing 64 is constituted by a middle cylindrical member 66 of about cylindrical shape, a lid member 68 that obstructs the upper opening of the middle cylindrical member 66, and a bottom member 70 that obstructs the lower opening of the middle cylindrical member 66.

The middle cylindrical member 66 has a generally cylindrical shape having a thin wall and a large diameter, provided with an upper clinching piece 72 and a lower clinching piece 74 respectively at the upper and lower ends thereof. In the up-down middle portion of the middle cylindrical member 66, the stator 14 having the overlapped outer yokes 20, 20 is inserted. Thus, the middle cylindrical member 66 is desirably formed of a nonmagnetic material such as an aluminum alloy or the like, for avoiding magnetic flux leakage.

The lid member 68 has a shape of an inverted bowl, including a flange-shaped upper clinching part 76 provided at the opening thereof. The upper clinching part 76 is superposed on the radially outer end of the upper plate spring 40 from above and inserted in the middle cylindrical member 66. Then, the upper clinching piece 72 of the middle cylindrical member 66 is bent to the radially inner side and superposed to the upper clinching part 76 from above. As a result, the lid member 68 is fixed to the upper part of the middle cylindrical member 66, thereby closing the upper opening of the middle cylindrical member 66. Note that an upper stopper rubber 78 of about disk shape is fixed to the lower face of the radial center of the lid member 68.

The bottom member 70 has a substantially bottomed cylindrical shape, including a flange-shaped lower clinching part 80 provided at the opening thereof. The lower clinching part 80 is fastened by clinching using the lower clinching piece 74 of the middle cylindrical member 66. As a result, the bottom member 70 is fixed to the lower part of the middle cylindrical member 66, thereby closing the lower opening of the middle cylindrical member 66. Note that a lower stopper rubber 82 of about disk shape is fixed to the upper face of the radial center of the bottom member 70.

The lower groove side wall of the outer connecting member 56 that is fixed to the radially outer end of the elastic connecting rubber 52 is superposed on the lower clinching part 80 of the bottom member 70 in the up-down direction. The outer connecting member 56 is fastened by clinching to the middle cylindrical member 66, together with the bottom member 70. By so doing, the stator 14 is clamped between the upper clinching part 76 of the lid member 68 and the lower clinching part 80 of the bottom member 70 in the up-down direction, so that the stator 14 is positioned relative to the housing 64.

The active vibration damper 12 structured in this way is mounted on the vehicle by the housing 64 that supports the stator 14 being fixed to a vehicle body 84, which is a member subject to vibration damping. When the active vibration damper 12 is mounted on the vehicle, the mover 16 is elastically supported on the vehicle body 84 via the elastic connecting rubber 52. The attachment structure of the housing 64 in relation to the vehicle body 84 is not especially limited. The housing 64 can be attached to the vehicle body 84, for example by bolt fixation via the middle cylindrical member 66 or a bracket fitted externally about the bottom member 70, direct press-fit fixation of the middle cylindrical member 66 or the bottom member 70 into the press-fit hole of the vehicle body 84, and welding fixation.

Through the energization to the coils 18, 18 of the stator 14, the magnetic poles are formed respectively at the upper and lower magnetic pole forming parts 24, 26 of the outer yokes 20, 20. Consequently, a magnetic attractive force and a magnetic repulsive force act between the upper outer yoke 20 and the upper inner yoke 34 and between the lower outer yoke 20 and the lower inner yoke 36, so that the mover 16 is displaced relative to the stator 14 in the axial direction.

Depending on the frequency of the vibration subject to damping, the energization to the coils 18, 18 is controlled, thereby oscillating the mover 16 with the target frequency in the up-down direction. The oscillation force is transmitted from the mover 16 to the housing 64 via the elastic connecting rubber 52, and exerted to the vehicle body 84, thereby reducing the vibration of the vehicle body 84 in an offset fashion.

In this active vibration damper 12 structured according to the present embodiment, the electromagnetic actuator 10 is used as an actuator which exhibits an oscillation force. For the electromagnetic actuator 10, the first through holes 46 and the second through holes 48 are formed in the upper plate spring 40 and the lower plate spring 42 that mutually connect the stator 14 and the mover 16. The first through holes 46 and the second through holes 48 are overlapped with the space 38 between the stator 14 and the mover 16 in the radial direction, when viewed in the axial direction. Owing to this, before attachment of the lid member 68 of the housing 64 when the stator 14 and the mover 16 are mutually connected by the upper and lower plate springs 40, 42, the space 38 between the stator 14 and the mover 16 in the radial direction is exposed through the first through holes 46 and the second through holes 48. Therefore, when the stator 14 and the mover 16 are mutually connected by the upper and lower plate springs 40, 42, the space 38 between the stator 14 and the mover 16 can be visually checked through the first and second through holes 46, 48, for example. In the same situation, it is also possible to measure the radial distance of the facing faces of the stator 14 and the mover 16 (the radial width dimension of the space 38), and to insert a test instrument such as a fiberscope or the like into the space 38 via the first and second through holes 46, 48.

The radial width dimensions of the first and second through holes 46, 48 are widened in relation to that of the space 38, whereby both the inner peripheral face 50 of the stator 14 and the outer peripheral face 51 of the mover 16 are exposed through the first and second through holes 46, 48. This makes it easy to grasp relative radial positions of the stator 14 and the mover 16 more correctly.

Especially according to the method of manufacturing the electromagnetic actuator 10 as will be described hereinafter, the stator 14 and the mover 16 can be positioned in the radial direction with easiness and high accuracy.

Specifically, first, the stator 14 is inserted in the middle cylindrical member 66 of the housing 64, and the mover 16 is inserted in the stator 14. In addition, the upper plate spring 40 and the lower plate spring 42 are inserted in the middle cylindrical member 66 via the respective openings, and then superposed on the respective upper-lower faces of the stator 14 and the mover 16. Moreover, the elastic connecting rubber 52 having the inner connecting member 54 and the outer connecting member 56 is inserted in the middle cylindrical member 66, and the inner connecting member 54 and the outer connecting member 56 are superposed on the lower plate spring 42 from below.

Next, the connecting bolt 60 is inserted in the central holes of the upper plate spring 40, the mover 16, the lower plate spring 42, and the inner connecting member 54, then the connecting nut 62 is threaded onto the lower end of the connecting bolt 60 where the screw thread is formed. Here, the components are temporarily connected by adjusting the screwing amount of the connecting bolt 60 and the connecting nut 62. In the temporarily connected state, the upper plate spring 40, the mover 16, the lower plate spring 42, and the inner connecting member 54 are not separated in the axial direction, and they are allowed to be displaced relatively in the axis-perpendicular direction.

Figure 5:
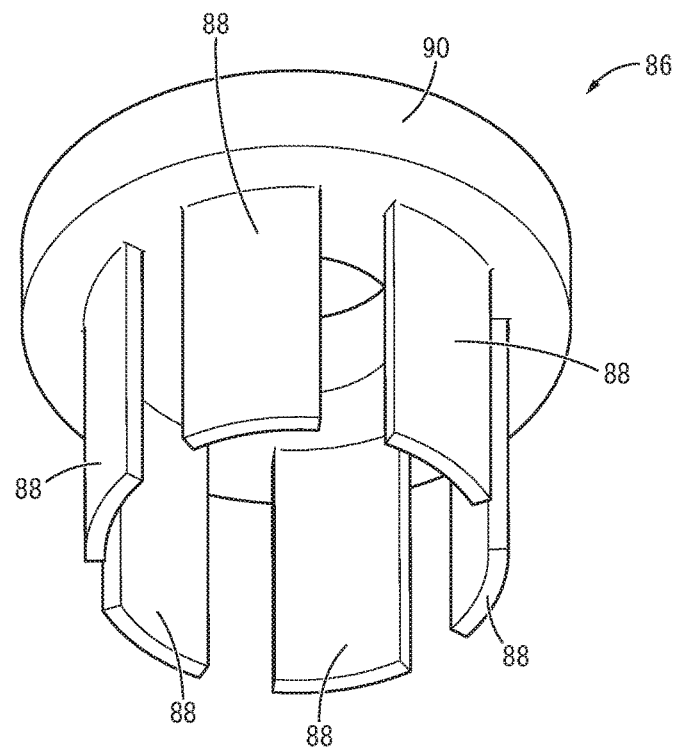
FIG. 5 is a perspective view of a spacer jig used for the space setting step in the manufacture of the active vibration damper shown in FIG. 4.

Then, a spacer jig 86 is inserted in the middle cylindrical member 66. As FIG. 5 shows, the spacer jig 86 has a structure wherein a plurality of spacer parts 88 project from an insertion regulator part 90 of about annular shape. The spacer part 88 has a shape of an arched plate extending in the circumferential direction that corresponds to the space 38 between the stator 14 and the mover 16. The thick dimension of the spacer part 88 is set equal to the distance that should be set for the radial space between the stator 14 and the mover 16. Besides, the plurality of spacer parts 88 are formed to be arranged in sequence in the circumferential direction and disposed in positions that correspond to the first and second through holes 46, 48 in the upper and lower plate springs 40, 42 in the circumferential direction. The plurality of spacer parts 88 extend in the up-down direction with generally the same cross-sectional shapes relative to one another, and they are disposed at equal intervals in the circumferential direction.

With respect to the plurality of spacer parts 88 of this embodiment, the base end parts (the upper ends in FIG. 4) are integrally connected by the annular insertion regulator part 90. However, the plurality of spacer parts 88 are not always required to be integrally connected by the insertion regulator part 90, i.e., they may be separated from one another. Moreover, for example, it is also possible to adopt a structure wherein the insertion regulator part 90 is divided into plurality in the circumferential direction. It is possible as well that some of the spacer parts 88 are mutually connected by a part of the insertion regulator part 90, while other ones of the spacer parts 88 are mutually connected by another part of the insertion regulator part 90. Furthermore, the spacer parts 88 and the insertion regulator part 90 are not limited to an integral structure, and they can be each made as an individual part and be later fixed to one another.

Figure 4:
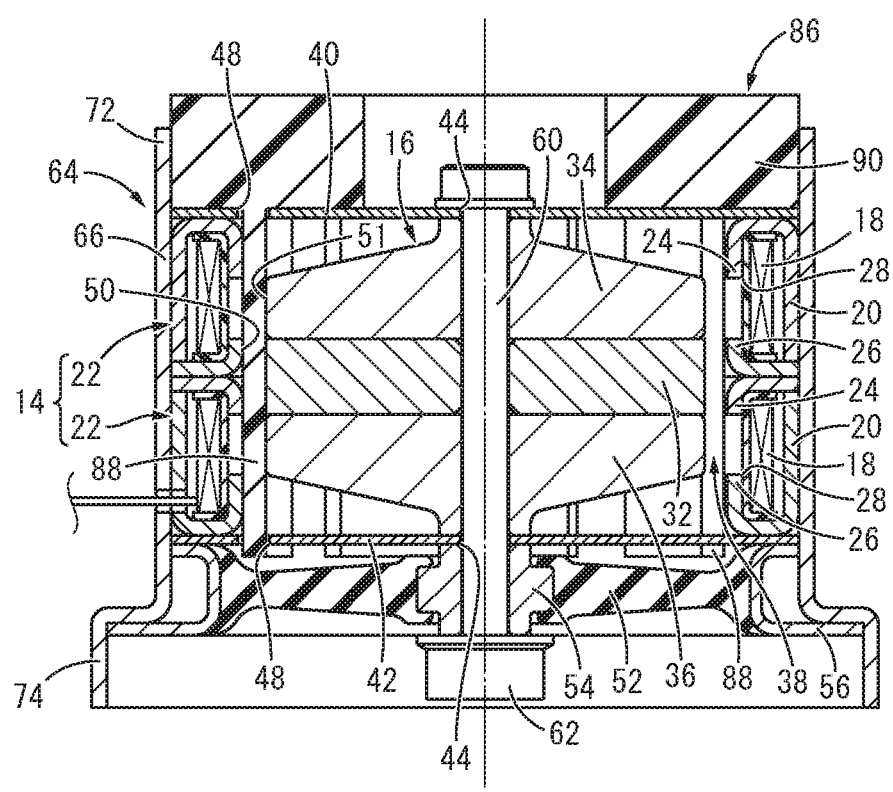
FIG. 4 is a longitudinal cross-sectional view suitable for explaining a space setting step in manufacture of the active vibration damper shown in FIG. 1.
Figure 6:
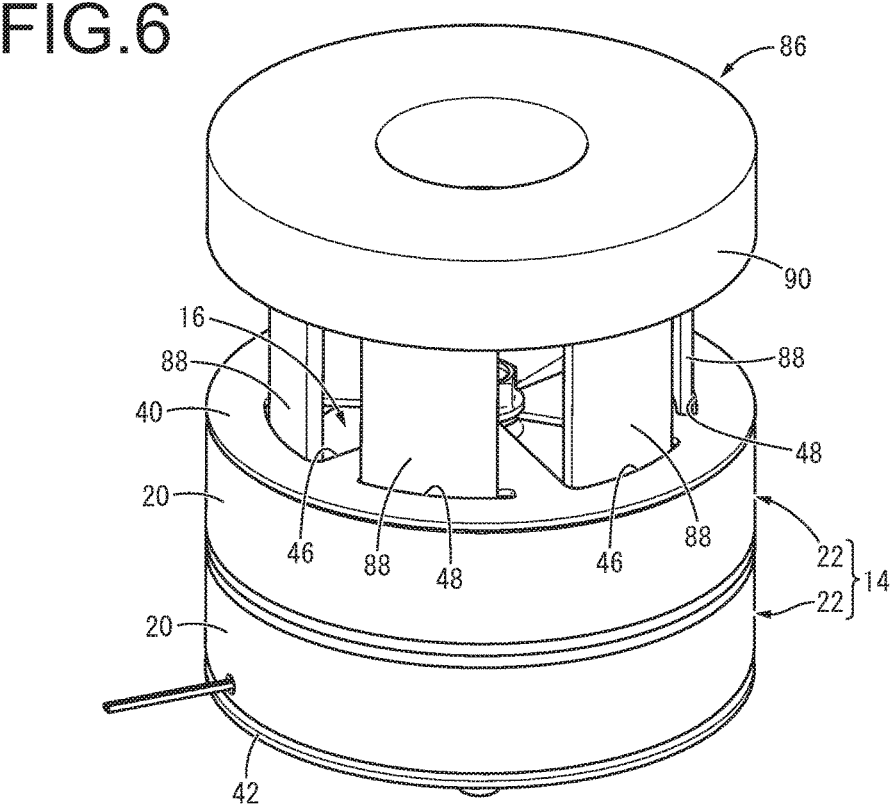
FIG. 6 is a perspective view suitable for explaining the space setting step in the manufacture of the active vibration damper shown in FIG. 4.

As FIGS. 4 and 6 show, the spacer parts 88 of the spacer jig 86 are inserted into the space 38 between the stator 14 and the mover 16 in the radial direction, through the first through holes 46 and the second through holes 48 of the upper plate spring 40. This displaces the mover 16, which is temporarily connected to the upper and lower plate springs 40, 42 by the connecting bolt 60 and the connecting nut 62, as appropriate in the axis-perpendicular direction, in relation to the stator 14 that is relatively positioned by the upper and lower plate springs 40, 42 and the middle cylindrical member 66. This displacement suitably sets the radial distance between the stator 14 and the mover 16. By the aforesaid work, a space setting step for setting the radial distance between the stator 14 and the mover 16, namely the radial dimension of the space 38, using the thickness of the spacer parts 88, is completed. In FIG. 6, for making it easily seeable that the spacer parts 88 of the spacer jig 86 are inserted through the first through holes 46 and the second through holes 48 of the upper plate spring 40, the elastic connecting rubber 52 including the inner connecting member 54 and the outer connecting member 56 and the middle cylindrical member 66 are omitted.

The insertion regulator part 90 of the spacer jig 86 is inserted in the upper part of the middle cylindrical member 66 and superposed on the upper face of the upper plate spring 40. In this way, it is possible to readily regulate the axial positions of the spacer parts 88 relative to the space 38. In this embodiment, the spacer parts 88 pass in the up-down direction through the space 38 between the stator 14 and the mover 16, and the lower ends of the spacer parts 88 are inserted in the first through holes 46 and the second through holes 48 of the lower plate spring 42. Since the insertion regulator part 90 has an annular shape, the head part of the connecting bolt 60, which protrudes further upward than the upper plate spring 40, is exposed to the upper side via the central hole of the insertion regulator part 90.

When the stator 14 and the mover 16 are relatively positioned by the spacer jig 86 in this way, tightening torque is applied on the connecting bolt 60 and the connecting nut 62, thereby connecting and fixing the mover 16, the upper and lower plate springs 40, 42, and the inner connecting member 54 to one another. This fastens the mover 16, the upper and lower plate springs 40, 42, and the inner connecting member 54 integrally with one another, while avoiding displacement of the mover 16 and the inner connecting member 54 relative to the upper and lower plate springs 40, 42 in the axis-perpendicular direction.

Next, the bottom member 70 prepared in advance is inserted in the middle cylindrical member 66 from below, and the lower clinching part 80 of the bottom member 70 is fastened by clinching using the lower clinching piece 74 of the middle cylindrical member 66, thereby connecting and fixing the middle cylindrical member 66 and the bottom member 70. Then, the lower groove side wall of the outer connecting member 56, which is superposed to the lower clinching part 80 of the bottom member 70, is fastened by clinching using the lower clinching piece 74 of the middle cylindrical member 66 together with the lower clinching part 80.

Then, the spacer jig 86 is removed from the middle cylindrical member 66 to the upper side. After that, the lid member 68 prepared in advance is inserted in the middle cylindrical member 66, and superposed to the upper plate spring 40 from above. The upper clinching piece 72 of the middle cylindrical member 66 is folded to the radially inner side and superposed to the upper clinching part 76 of the lid member 68, thereby completing the housing 64. Also, by fixing the lid member 68 to the middle cylindrical member 66, the stator 14, the radially outer ends of the upper and lower plate springs 40, 42, and the outer connecting member 56 are positioned between the upper clinching part 76 of the lid member 68 and the lower clinching part 80 of the bottom member 70 in the up-down direction. By the above-described work, the manufacturing process of the active vibration damper 12 including the electromagnetic actuator 10 is completed.

In this embodiment, the stator 14 and the radially outer ends of the upper and lower plate springs 40, 42 are fixed to one another, after the mover 16 and the central parts of the upper and lower plate springs 40, 42 are fixed by the connecting bolt 60 and the connecting nut 62. If it is not the structure wherein the lid member 68 and the bottom member 70 obstruct the openings of the middle cylindrical member 66 for example, it is possible as well that the stator 14 and the upper and lower plate springs 40, 42 are fixed to one another, before the mover 16 and the upper and lower plate springs 40, 42 are connected to one another by the connecting bolt 60 and the connecting nut 62. Besides, if it is not the structure wherein the lid member 68 and the bottom member 70 obstruct the openings of the middle cylindrical member 66, it is also possible that both the stator 14 and the mover 16 are fixed to the upper and lower plate springs 40, 42, before the spacer jig 86 is removed and the spacer parts 88 are extracted from the space 38.

According to this method of manufacturing the electromagnetic actuator 10 of this embodiment, the space 38 between the stator 14 and the mover 16 in the radial direction is set with easiness and high precision, by the thickness of the spacer parts 88 of the spacer jig 86 inserted in the radial space between the stator 14 and the mover 16 via the first and second through holes 46, 48 of the upper plate spring 40. Therefore, it is possible to obtain the magnetic attractive and repulsive forces acting between the stator 14 and the mover 16 with good accuracy. Consequently, it is possible to attain excellent vibration damping performance in the active vibration damper 12 using the electromagnetic actuator 10, for example.

In the present embodiment, the plurality of spacer parts 88 are provided in sequence in the circumferential direction, and all of them are inserted in the space between the stator 14 and the mover 16, via the first and second through holes 46, 48 of the upper plate spring 40. By so doing, the stator 14 and the mover 16 are positioned relative to each other at a plurality of locations in the circumferential direction, by the spacer parts 88. Owing to this, the stator 14 and the mover 16 can be positioned more precisely, thereby getting the target oscillation force at a higher level of precision.

The plurality of spacer parts 88 are formed with generally the same shape and arranged in sequence in the circumferential direction by equal intervals, and so do the radially outer parts of the first through holes 46, and the second through holes 48, in which the spacer parts 88 are inserted. Therefore, it is not necessary to position specific spacer parts 88 in relation to specific through holes 46, 48 in the circumferential direction. This makes it easy to insert the spacer parts 88 in the through holes 46, 48. Additionally, the size of the space 38 between the stator 14 and the mover 16 is set by the spacer parts 88 having one shape in common, which are inserted at locations apart by equal intervals in the circumferential direction. This makes it possible to more stably set the space 38 between the stator 14 and the mover 16.

The spacer part 88 of this embodiment has a shape of an arched plate extending in the circumferential direction, corresponding to the space 38 between the stator 14 and the mover 16. The outer peripheral face of the spacer part 88 is abutted against the inner peripheral face 50 of the stator 14 with a certain extent of width in the circumferential direction. Meanwhile, the inner peripheral face of the spacer part 88 is abutted against the outer peripheral face 51 of the mover 16 with a certain extent of width in the circumferential direction. Thus, when the stator 14 and the mover 16 are relatively positioned by inserting the spacer parts 88 into the space 38 between them, the stator 14 and the mover 16 can be stably kept at appropriate positions by the spacer parts 88.

Figure 7:
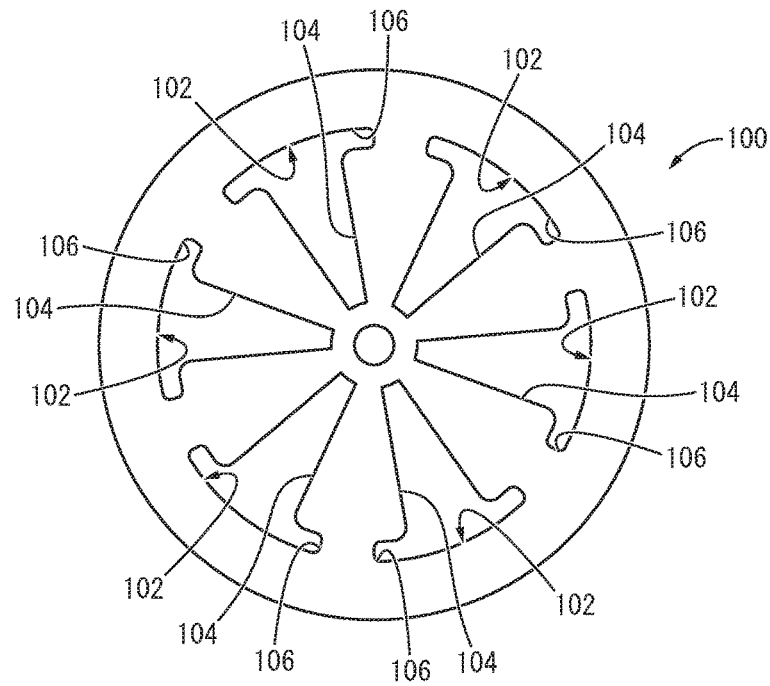
FIG. 7 is a plan view of a plate spring of an electromagnetic actuator as another embodiment of the present invention.

The embodiment of the present invention has been described, but the present invention is not limited by the specific description of the embodiment. For example, the shapes of the first and second through holes 46, 48 formed in the upper and lower plate springs 40, 42 in the aforementioned embodiment are just examples, and through holes of other shapes can be adopted. Specifically, for example, it is possible to form six through holes 102 of the same shape circumferentially spaced away from one another, as a plate spring 100 shown in FIG. 7. For the through hole 102 of the plate spring 100 shown in FIG. 7, the radially inner part is a spring adjustment part 104 of about fan-like shape, while the radially outer part is a spacer insertion part 106 of slit shape extending in the circumferential direction. Then, the circumferential length of the spacer insertion part 106 is longer than that of the spring adjustment part 104. In the plate spring 100 like this, the spacer insertion part 106 of the through hole 102 is positioned relative to the radial space between the stator and the mover so that the spacer parts of the spacer jig shown in the above-described embodiment are inserted in the radial space between the stator and the mover through the spacer insertion parts 106.

Figure 8:
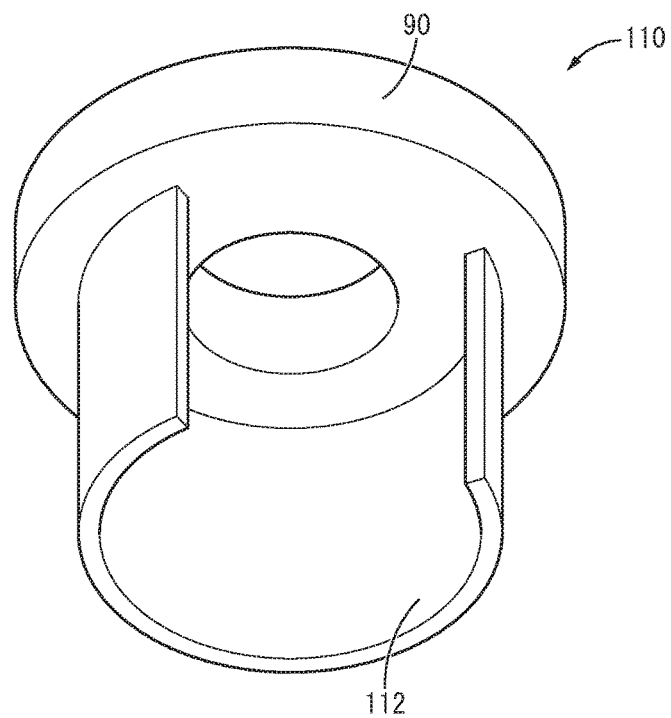
FIG. 8 is a perspective view of a spacer jig used for a space setting step in manufacture of an electromagnetic actuator as yet another embodiment of the present invention.

The number of the through holes formed at the plate spring is not especially limited. For example, it is also possible to form one through hole that is continuous in the circumferential direction in a substantially C character shape. In this case, it is possible as well to use a spacer jig 110 as shown in FIG. 8. Specifically, the spacer jig 110 includes only a single spacer part 112 of arched plate shape extending like a C character that is shorter than one circumference in the circumferential direction, while projecting from the insertion regulator part 90. This spacer part 112 can be inserted in the through hole extending like a substantially C character shape in the circumferential direction in the plate spring.

Figure 9:
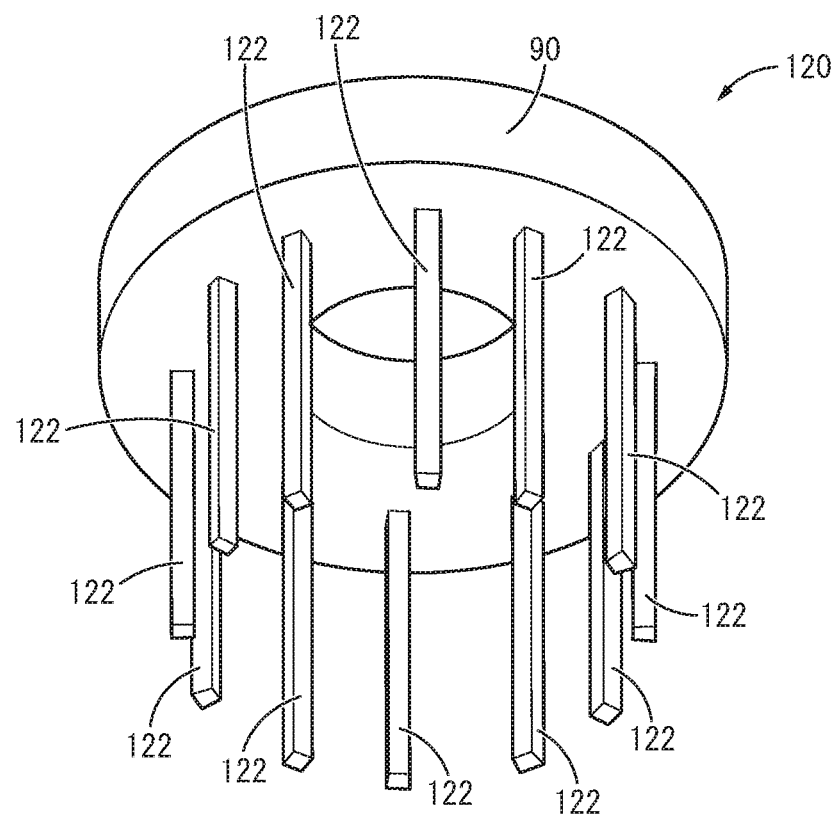
FIG. 9 is a perspective view of a spacer jig used for a space setting step in manufacture of an electromagnetic actuator as still yet another embodiment of the present invention.

Additionally, it is preferable that the spacer part of the spacer jig has an arched plate shape shown in the aforesaid embodiment. However, for example, it is also possible to use a rod-shaped spacer part 122 like a case of a spacer jig 120 shown in FIG. 9, as long as the dimension of the spacer part is equal to the preferable radial distance between the stator and the mover, while the stator and the mover are positioned at appropriate relative positions by the insertion of the spacer part.

The aforementioned embodiment shows just as one example the structure wherein the upper and lower plate springs 40, 42 are disposed, and the through holes 46, 48 are formed in each of the plurality of plate springs 40, 42. Alternatively, it is possible that the through holes are formed only in the upper plate spring, while no through holes are formed at positions corresponding to the space between the stator and the mover in the lower plate spring.

The above-said embodiment shows an example wherein the spacer parts 88 of the spacer jig 86 are inserted through the through holes 46, 48 and the space 38 only from the upper side. It is also possible to adopt two spacer jigs having a symmetrical structure in the up-down direction. For this case, the spacer part of the upper spacer jig can be inserted in the upper plate spring from the upper side, while the spacer part of the lower spacer jig can be inserted in the lower plate spring from the lower side, so that the spacer parts can be inserted respectively from the upper and lower sides in the space between the stator and the mover.

In the aforementioned embodiment, the radially inner part of the first through hole 46 having a fan-like hole cross-sectional shape is formed in order to adjust the spring characteristics of the plate springs 40, 42. Alternatively, it is possible to adopt a plate spring whose shape includes holes of about spiral shape for adjusting the spring characteristics, as well as a plurality of arms that extend in the radial direction while tilting in the circumferential direction or the like. Note that the through hole can be formed by using a hole that adjusts the spring characteristics of the plate spring (a spring adjustment hole), or it may be integrally formed by partly expanding the spring adjustment hole, or it may be formed independently from the spring adjustment hole.

The above-described embodiment shows as an example the structure wherein the mover 16 is inserted in the tubular stator 14. It is also possible to use a structure wherein the mover has a tubular shape, and the stator is inserted in the mover, for example. Also, the coil 18 is not always required to be provided at the stator 14, and a structure wherein the mover includes a coil while the stator includes a permanent magnet can be used as well.

The application scope of the present invention is not limited to the electromagnetic actuator for the active vibration damper. For example, the present invention can be applied to an electromagnetic actuator for an active fluid-filled vibration damping device. Moreover, the electromagnetic actuator according to this invention is not limited to one for automobiles, and it may be applied to an active vibration damper whose vibration damping subject is such a household appliance as a washing machine etc., for example.

What is claimed is:

1. An electromagnetic actuator comprising:
   a stator and a mover configured to have an oscillation force exerted between them, the stator and the mover being arranged in a direction orthogonal to a direction of oscillation with a space in between; and
   at least one plate spring connecting the stator and the mover to each other, the plate spring permitting relative displacement of the stator and the mover in the direction of oscillation while positioning the stator and the mover with respect to each other in the direction orthogonal to the direction of oscillation, wherein
   at least one through hole piercing the plate spring in a thickness direction is formed in a portion of the plate spring that corresponds to the space between the stator and the mover,
   one of the stator and the mover includes a coil and magnetic pole parts formed through energization to the coil, the magnetic pole parts facing the space,
   another of the stator and the mover includes a magnet and magnetic poles formed by the magnet, the magnetic poles facing the space, and
   through energization to the coil, a magnetic attractive force and a magnetic repulsive force act between the magnetic pole parts and the magnetic poles so that the mover is displaced relative to the stator in the direction of oscillation.

2. The electromagnetic actuator according to claim 1, wherein the at least one plate spring comprises a plurality of plate springs that are remote from each other in the direction of oscillation, and the through hole of each plate spring is formed in a position corresponding to each other in the direction of oscillation.

3. The electromagnetic actuator according to claim 2, wherein the plate springs are disposed on both outer sides of the stator and the mover in the direction of oscillation.

4. The electromagnetic actuator according to claim 1, wherein the at least one through hole of the plate spring comprises a plurality of through holes, and the through holes are arranged in sequence in a circumferential direction that corresponds to the space between the stator and the mover.

5. The electromagnetic actuator according to claim 1, wherein the through hole has a hole cross-sectional shape extending in a circumferential direction that corresponds to the space between the stator and the mover.

6. An active vibration damper comprising the electromagnetic actuator according to claim 1, wherein
   the stator is configured to be attached to a member subject to vibration damping so that the mover is elastically supported on the member subject to vibration damping via an elastic connecting rubber.

* * * * *